United States Patent
Pezeshki et al.

(10) Patent No.: US 11,456,834 B2
(45) Date of Patent: Sep. 27, 2022

(54) ADAPTIVE DEMODULATION REFERENCE SIGNAL (DMRS)

(71) Applicant: QUALCOMM Incorporated, San Diego, CA (US)

(72) Inventors: Hamed Pezeshki, San Diego, CA (US); Tao Luo, San Diego, CA (US); Sony Akkarakaran, Poway, CA (US)

(73) Assignee: QUALCOMM Incorporated, San Diego, CA (US)

(*) Notice: Subject to any disclaimer, the term of this patent is extended or adjusted under 35 U.S.C. 154(b) by 116 days.

(21) Appl. No.: 17/019,137

(22) Filed: Sep. 11, 2020

(65) Prior Publication Data

US 2022/0085935 A1 Mar. 17, 2022

(51) Int. Cl.
H04W 72/04 (2009.01)
H04L 5/00 (2006.01)
G06N 20/00 (2019.01)

(52) U.S. Cl.
CPC ........... *H04L 5/0048* (2013.01); *G06N 20/00* (2019.01); *H04W 72/0413* (2013.01)

(58) Field of Classification Search
CPC .. H04B 7/0413; H04B 7/0421; H04B 7/0452; G01S 7/417; G06N 20/00; H04L 5/0048; H04L 41/16; H04L 2012/5686; H04L 25/0254; H04L 25/03165; H04L 2025/03464; H04N 21/4666; H04W 72/0413
See application file for complete search history.

(56) References Cited

U.S. PATENT DOCUMENTS

| | | | | |
|---|---|---|---|---|
| 9,337,974 | B2* | 5/2016 | Miao | H04L 25/0222 |
| 10,666,342 | B1* | 5/2020 | Landis | G06N 3/0454 |
| 10,833,823 | B2* | 11/2020 | Nammi | H04L 27/2649 |
| 2015/0282123 | A1* | 10/2015 | Miao | H04L 5/0051 |
| | | | | 455/450 |
| 2018/0198580 | A1* | 7/2018 | Nammi | H04L 27/22 |
| 2019/0052527 | A1* | 2/2019 | Ghosh | H04L 41/0873 |
| 2019/0342164 | A1* | 11/2019 | Ghosh | H04B 7/0413 |

OTHER PUBLICATIONS

Honkala et al, DeepRx: Fully Convolutional Deep Learning Receiver, arXiv, 30 pages, May 4, 2020.*

* cited by examiner

*Primary Examiner* — Frank Duong
(74) *Attorney, Agent, or Firm* — Seyfarth Shaw LLP

(57) ABSTRACT

A method of wireless communication by a user equipment (UE) indicates, to a base station, a training state of a machine learning model for a given channel condition, and a request for a change in demodulation reference signal (DMRS) transmissions. The UE also receives DMRS transmissions in accordance with the training state for the given channel condition. The UE performs online training of the machine learning model with the DMRS transmissions. A UE may also request, from a base station, a specific number of demodulation reference signal (DMRS) symbols for a slot, and receive DMRS transmissions in response to the request to estimate a raw channel.

50 Claims, 10 Drawing Sheets

ADAPTIVE DEMODULATION REFERENCE SIGNAL (DMRS)

FIELD OF THE DISCLOSURE

Aspects of the present disclosure generally relate to wireless communications, and more particularly to techniques and apparatuses for adaptive demodulation reference signal (DMRS) transmission, for example, with machine learning-based receivers.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

According to an aspect of the present disclosure, a method of wireless communication by a user equipment (UE) indicates, to a base station, a training state of a machine learning model for a given channel condition. The UE also requests a change in demodulation reference signal (DMRS) transmissions. The UE receives DMRS transmissions in response to the request, based on the indicated training state. The UE performs online training of the machine learning model with the received DMRS transmissions.

In another aspect, a method of wireless communication by a UE requests, from a base station, a specific number of demodulation reference signal (DMRS) symbols for a slot. The method also receives DMRS transmissions in response to the requesting in order to estimate a raw channel.

In another aspect of the present disclosure, an apparatus for wireless communications at a user equipment (UE), includes a processor and memory coupled with the processor. Instructions stored in the memory are operable, when executed by the processor, to cause the apparatus to indicate, to a base station, a training state of a machine learning model for a given channel condition. The apparatus also requests a change in demodulation reference signal (DMRS) transmissions. The apparatus receives DMRS transmissions in response to the request, based on the indicated training state. The apparatus can perform online training of the machine learning model with the received DMRS transmissions.

In another aspect of the present disclosure, an apparatus for wireless communications at a user equipment (UE), includes a processor and memory coupled with the processor. Instructions stored in the memory are operable, when executed by the processor, cause the apparatus to request, from a base station, a specific number of demodulation reference signal (DMRS) symbols for a slot. The apparatus can also receive DMRS transmissions in response to the request, to estimate a raw channel.

In another aspect of the present disclosure, a UE includes means for indicating, to a base station, a training state of a machine learning model for a given channel condition. It also includes requesting a change in demodulation reference signal (DMRS) transmissions. The UE also includes means for receiving DMRS transmissions in response to the request, based on the indicated training state. The UE further includes means for performing online training of the machine learning model with the DMRS transmissions.

In another aspect of the present disclosure, a UE includes means for requesting, from a base station, a specific number of demodulation reference signal (DMRS) symbols for a slot. The UE also includes means for receiving DMRS transmissions in accordance with the request, to estimate a raw channel.

In another aspect of the present disclosure, a non-transitory computer-readable medium with program code recorded thereon is disclosed. The program code is executed by a user equipment (UE) and includes program code to indicate, to a base station, a training state of a machine learning model for a given channel condition. It also includes a request for a change in demodulation reference signal (DMRS) transmissions. The UE includes program code to receive DMRS transmissions in response to the request, based on the indicated training state. The UE further includes program code to perform online training of the machine learning model with the DMRS transmissions.

In another aspect of the present disclosure, a non-transitory computer-readable medium with program code recorded thereon is disclosed. The program code is executed by a user equipment (UE) and includes program code to request, from a base station, a specific number of demodulation reference signal (DMRS) symbols for a slot. The UE also includes program code to receive DMRS transmissions in accordance with the request, to estimate a raw channel.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description, may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
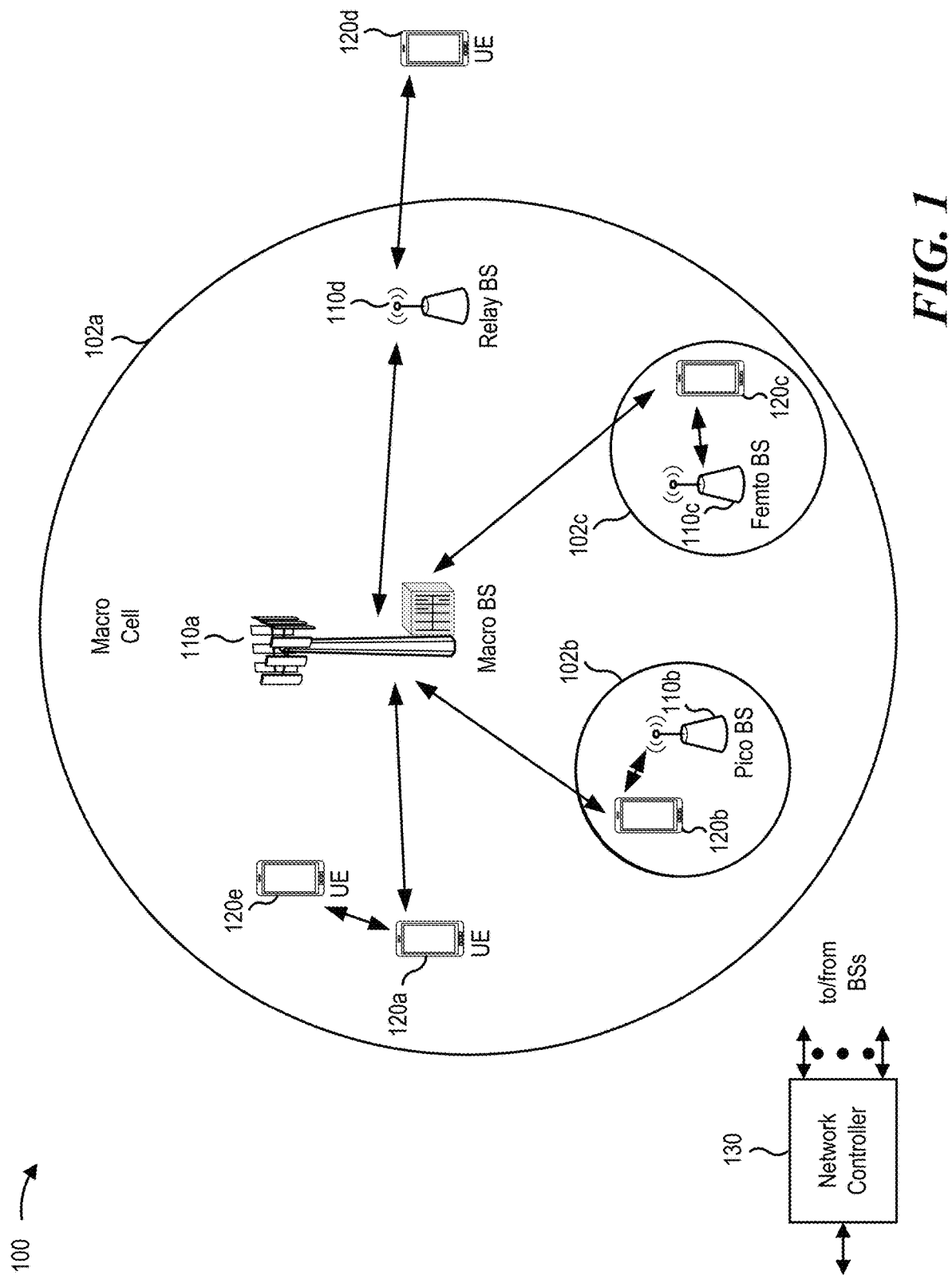
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Machine learning may be beneficial for wireless communications. For example, learning-based receivers can learn to estimate channel conditions from training data. After training, the learning-based receivers may estimate (e.g., infer) characteristics of channels. The receiver can rely upon the inferred channel characteristics instead of, or as a supplement, to conventional channel estimation. These receivers are also referred to as data-driven receivers.

As wireless communications occur between base stations and UEs, a pilot signal, such as demodulation reference signal (DMRS), may be transmitted to facilitate demodulation of data. According to an aspect of the present disclosure, a channel adaptive demodulation reference signal (DMRS) transmission is based on UE feedback. The channel adaptive DMRS may have applications with, for example, data-driven receivers or with beamformed communications.

In one aspect of the present disclosure, a data-driven user equipment (UE) receiver may be well-trained (e.g., offline) for particular channel conditions. As described below, a measure of decoding quality may determine whether the receiver is well-trained. The UE may indicate the state of training (e.g., well trained or not) to the base station (e.g., gNB). In response, the base station may transmit the demodulation reference signal (DMRS) less frequently for this UE, for the purpose of online training. In another aspect of the present disclosure, if for a given channel condition the UE has not been well-trained, the UE may request more frequent DMRS transmissions from the base station.

According to aspects of the present disclosure, the UE may transmit the feedback over a physical uplink control channel (PUCCH). In another aspect, the feedback from the UE can explicitly mention the reason for the request.

An adaptive, configurable DMRS has other applications. For example, in a millimeter wave system (e.g., frequency range two (FR2)), beam management procedures are executed to obtain best transmit beams and receive beams from the base station and UE, respectively, for a downlink scenario. Accordingly, downlink communications occur via the beamformed channel, which includes the best transmit and receive beams. The effective beamformed channel, however, only represents a portion of the overall channel.

According to aspects of the present disclosure, to obtain an estimate of the raw channel, the UE requests additional DMRSs. The UE sweeps through the receive beams to receive each additional DMRS on a different receive beam. In one aspect, the UE requests a specific number of DMRS transmissions (e.g., four). Based on the measurements from the multiple receive beams, the UE may select a better receive beam, directed more specifically towards an incident beam. Thus, the additional overhead of extra DMRSs can be compensated for by improved throughput based on a better channel estimate.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)).

A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
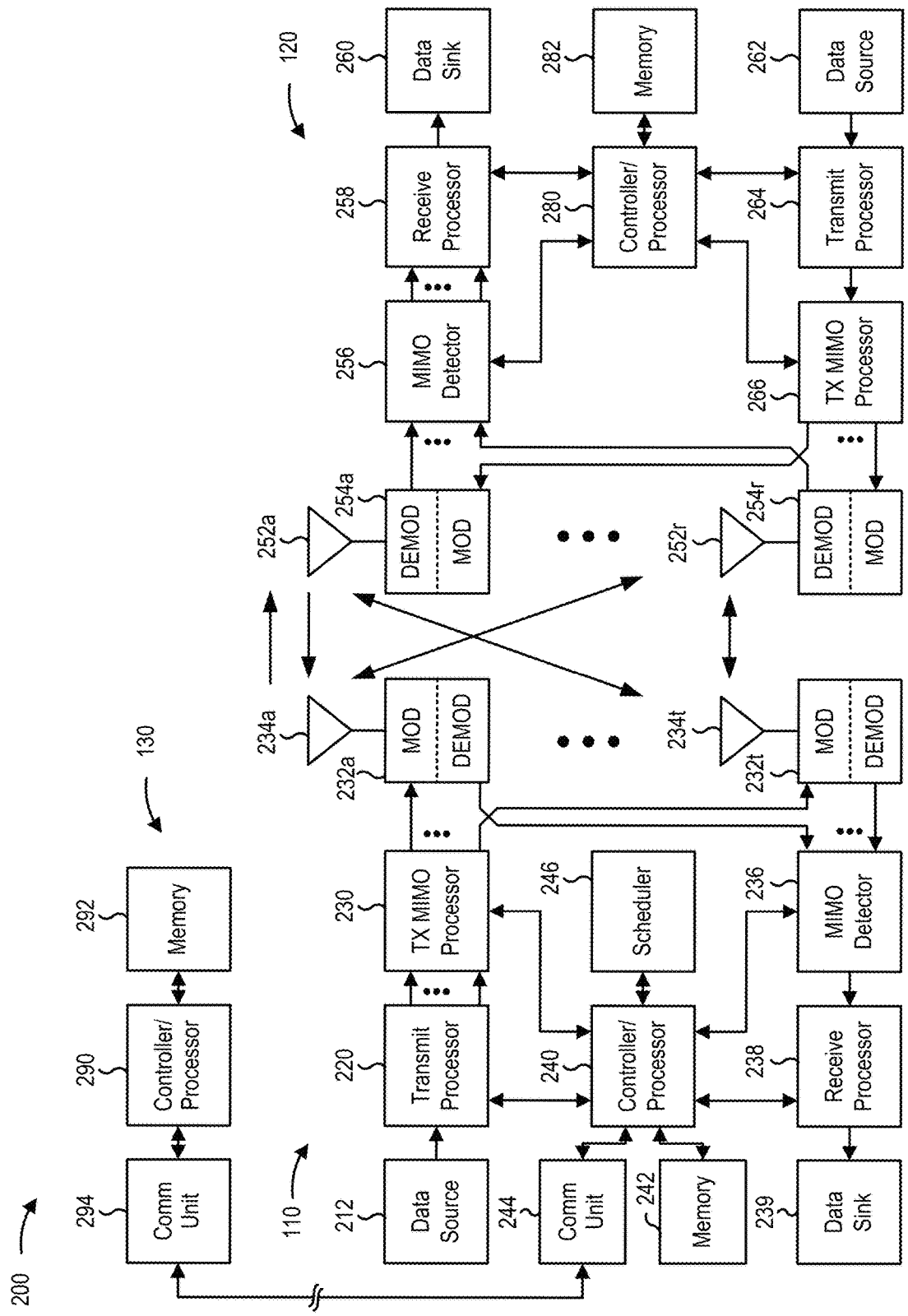
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, down-convert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 280 of the UE 120, and/or any other component(s) of FIG. 2 may perform one or more techniques associated with adaptive DMRS for machine learning as described in more detail elsewhere. For example, the controller/processor 280 of the UE 120, and/or any other component(s) of FIG. 2 may perform or direct operations of, for example, the processes of FIGS. 8-9 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for indicating, means for receiving, means for performing, and/or means for requesting. Such means may include one or more components of the UE 120 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicleto-anything (V2X) applications, and/or the like. Furthermore, in some cases, a single device may support different applications or services simultaneously.

Figure 3:
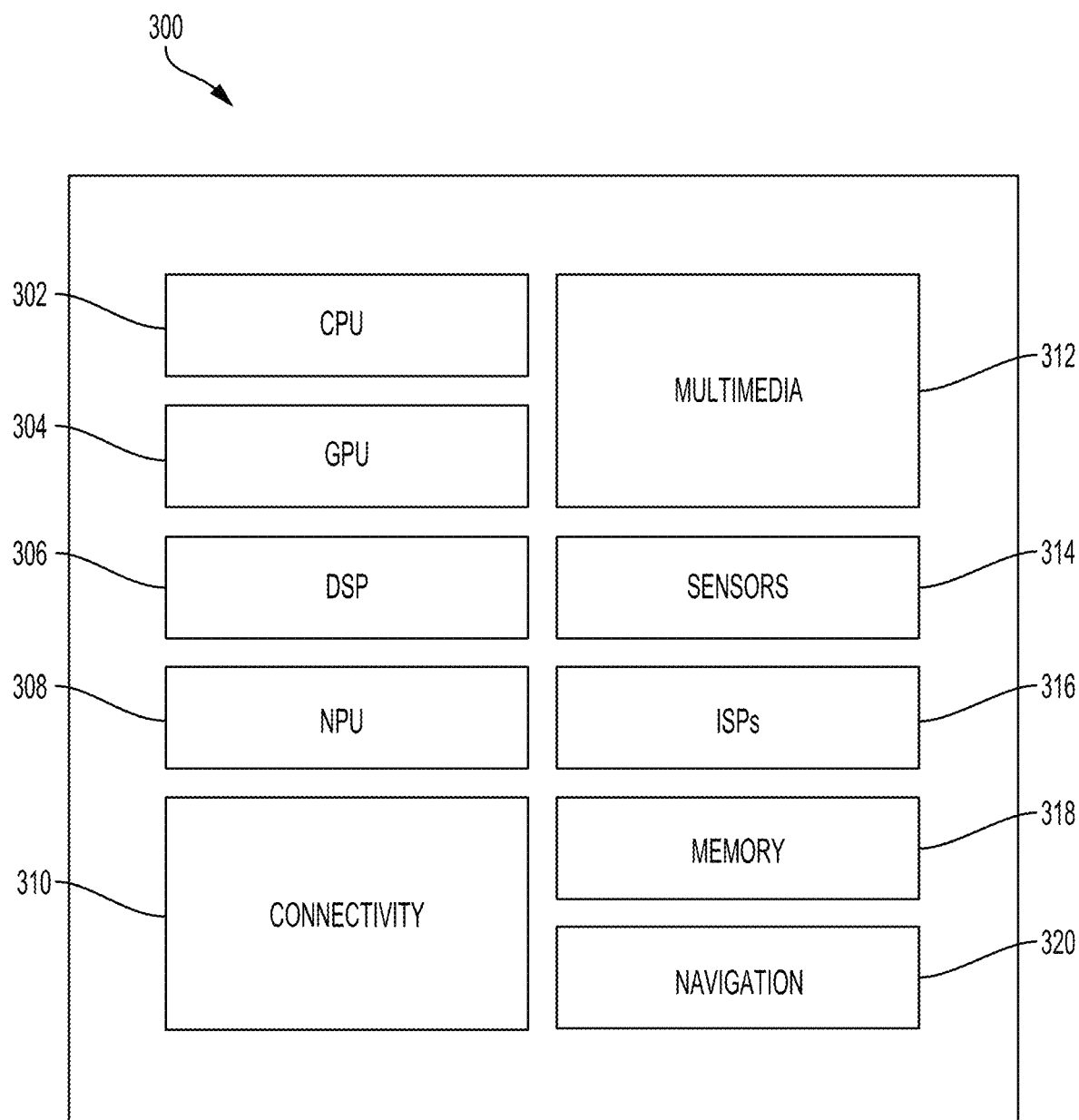
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for generating gradients for neural network training, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise code to indicate, to a base station, a training state of a machine learning model for a given channel condition, and a request for a change in demodulation reference signal (DMRS) transmissions. Additionally, the general-purpose processor 302 may comprise code to receive DMRS transmissions in accordance with the training state for the given channel condition, and code to perform online training of the machine learning model with the DMRS transmission. The general-purpose processor 302 may further comprise code to request, from a base station, a specific number of DMRS symbols for a slot, and code to receive DMRS transmissions in response to the request, to estimate a raw channel.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
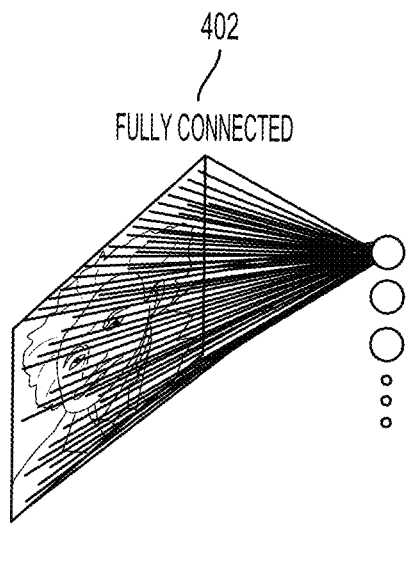
FIGS. 4A, 4B, and 4C are diagrams illustrating a neural network, in accordance with aspects of the present disclosure.
Figure 4B:
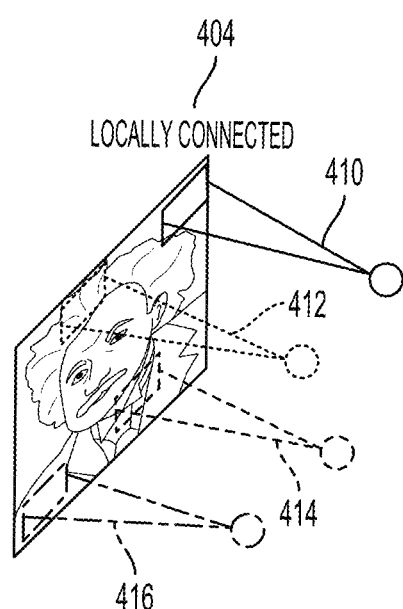

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
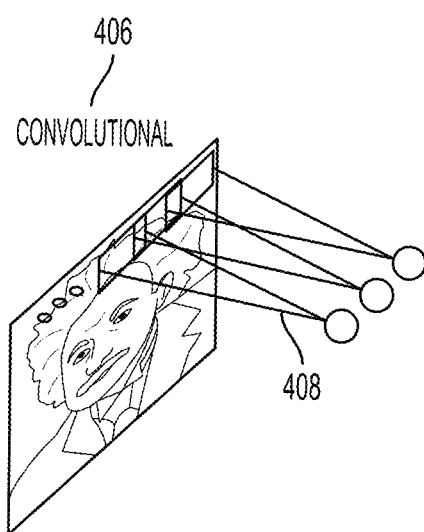

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
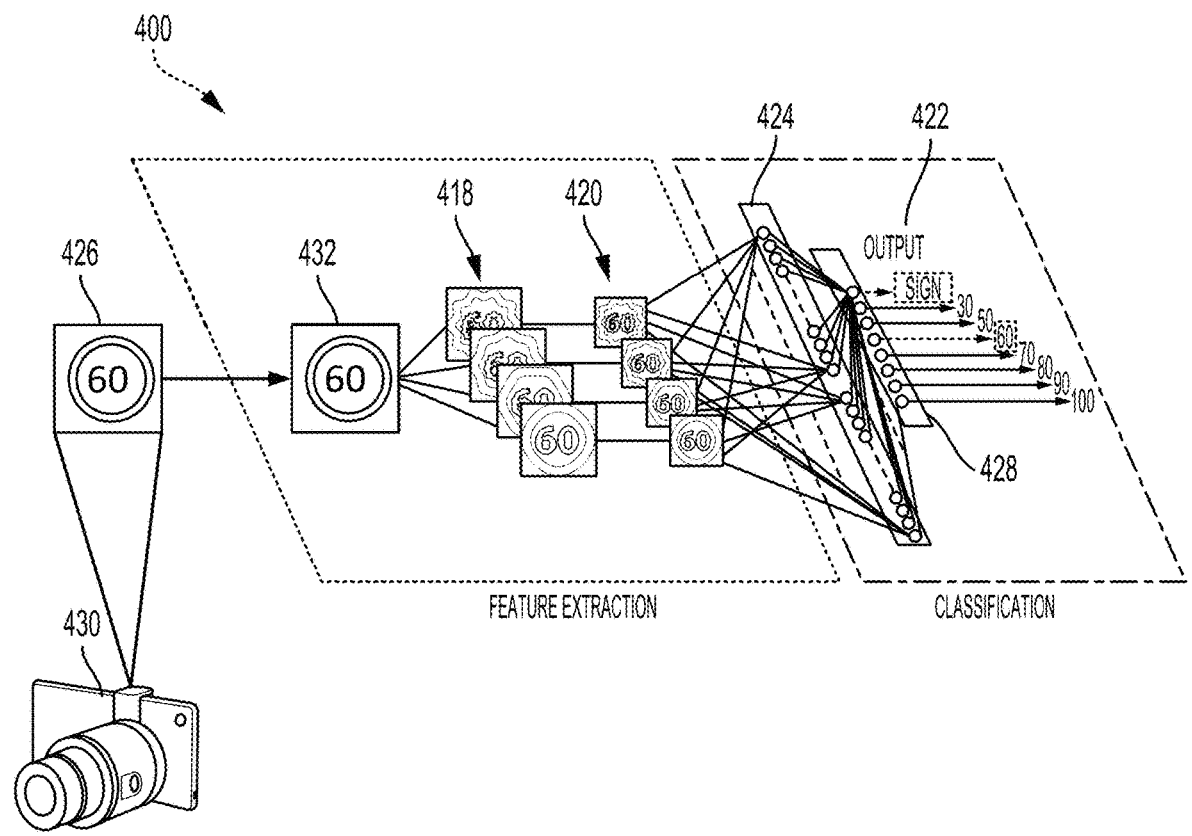
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
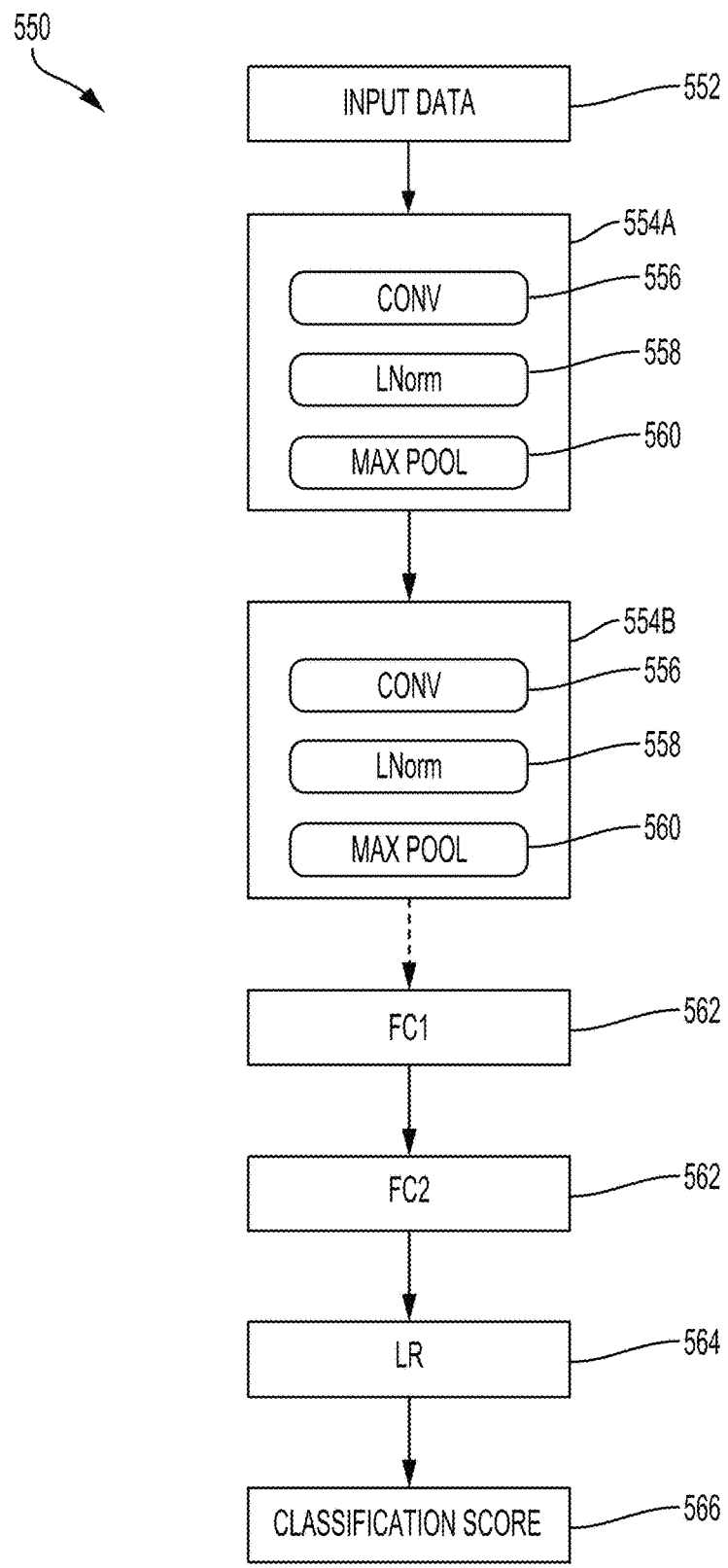
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

Machine learning may be beneficial for wireless communications. For example, learning-based receivers can learn to estimate (e.g., infer) channel conditions from training data. After training, the learning-based receivers may infer characteristics of channels. The receiver can rely upon the inferred channel characteristics instead of, or as a supplement to, conventional channel estimation. These receivers are also referred to as data-driven receivers.

A learning-based receiver architecture may be considered, for example, to avoid channel estimation in more challenging scenarios, such as in low-resolution analog-to-digital converter (ADC) systems. A class of these receivers decodes quantized signals independent of explicit channel estimation. The described class of receivers may learn characteristics of the quantized outputs at each beam, instead of estimating the channel state information (CSI), by considering the channel and quantization functions as a black box. Data-driven receivers may have less dependence on channel estimation, particularly if they have been well-trained for certain channel conditions.

The described receivers may be trained to learn channel conditions based on received reference signals (RSs). The reference signal training may be online training. As a result of the learning, the receivers may omit explicit channel estimation, and for instance, may instead look at a sequence of the transmitted and received training symbols to infer the channel.

As wireless communications occur between base stations and UEs, a pilot signal, such as demodulation reference signal (DMRS), may be transmitted to facilitate demodulation of data. The DMRS is utilized by a wireless communications device to produce channel estimates for demodulation of an associated physical channel. The DMRS may be device-specific, and thus, directly corresponds to data targeted to that particular UE. The DMRS may be transmitted on demand. The receivers may train on DMRSs.

According to an aspect of the present disclosure, a channel adaptive demodulation reference signal (DMRS) transmission is based on UE feedback. The channel adaptive DMRS may have applications with, for example, data-driven receivers with beamformed channels.

In one aspect of the present disclosure, a data-driven user equipment (UE) receiver may be well-trained (e.g., offline) for particular channel conditions. The UE may indicate this state of training to the base station (e.g., gNB). In response, the base station may transmit the demodulation reference signal (DMRS) less frequently for this UE, for the purpose of online training. For example, the base station may skip the DMRS for a slot or a few slots altogether. In another aspect, the base station may use a light training DMRS pattern (e.g., transmitting on fewer symbols), etc., for online training.

In another aspect of the present disclosure, if for a given channel condition the UE has not been well-trained, the UE may request more frequent DMRS transmissions from the base station. Alternatively, the UE may request a heavier DMRS pattern, etc., to perform online training and improve decoding quality. As an example, a number of symbols for the DMRS may increase for the heavier DMRS pattern.

According to an aspect of the present disclosure, a criterion for the UE to determine whether the machine learning model is well-trained is a measure of decoding quality. In one example, a measure of decoding quality is a bit error rate (BER).

In this example, if the bit error rate is less than a threshold, the UE may request less frequent DMRS training (and/or a light DMRS pattern), implying a performance of the previously trained receiver is equal to or greater than a performance threshold. If the bit error rate is larger than the threshold, the UE may request more frequent DMRS training (and/or a heavy DMRS pattern), implying the performance of the previously trained receiver is less than the performance threshold, and needs to improve through online training.

In summary, for some channel realizations, the UE may request more frequent reference signal transmission (e.g., because the UE has not been trained for similar channel realizations in the offline training phase). For other channel realizations, the UE may have been well-trained, and therefore the UE can request less frequent reference signal transmission.

According to aspects of the present disclosure, the UE may transmit the feedback over a physical uplink control channel (PUCCH). In another aspect, the feedback from the UE can explicitly mention the reason for the request. The reason may be for online training purposes, etc.

In still another aspect of the present disclosure, the DMRS used for online training of the data-driven receiver may be defined particularly for this purpose. That is, the DMRS pattern for online training may be different from legacy DMRS patterns defined in the current 3GPP specifications.

Figure 6:
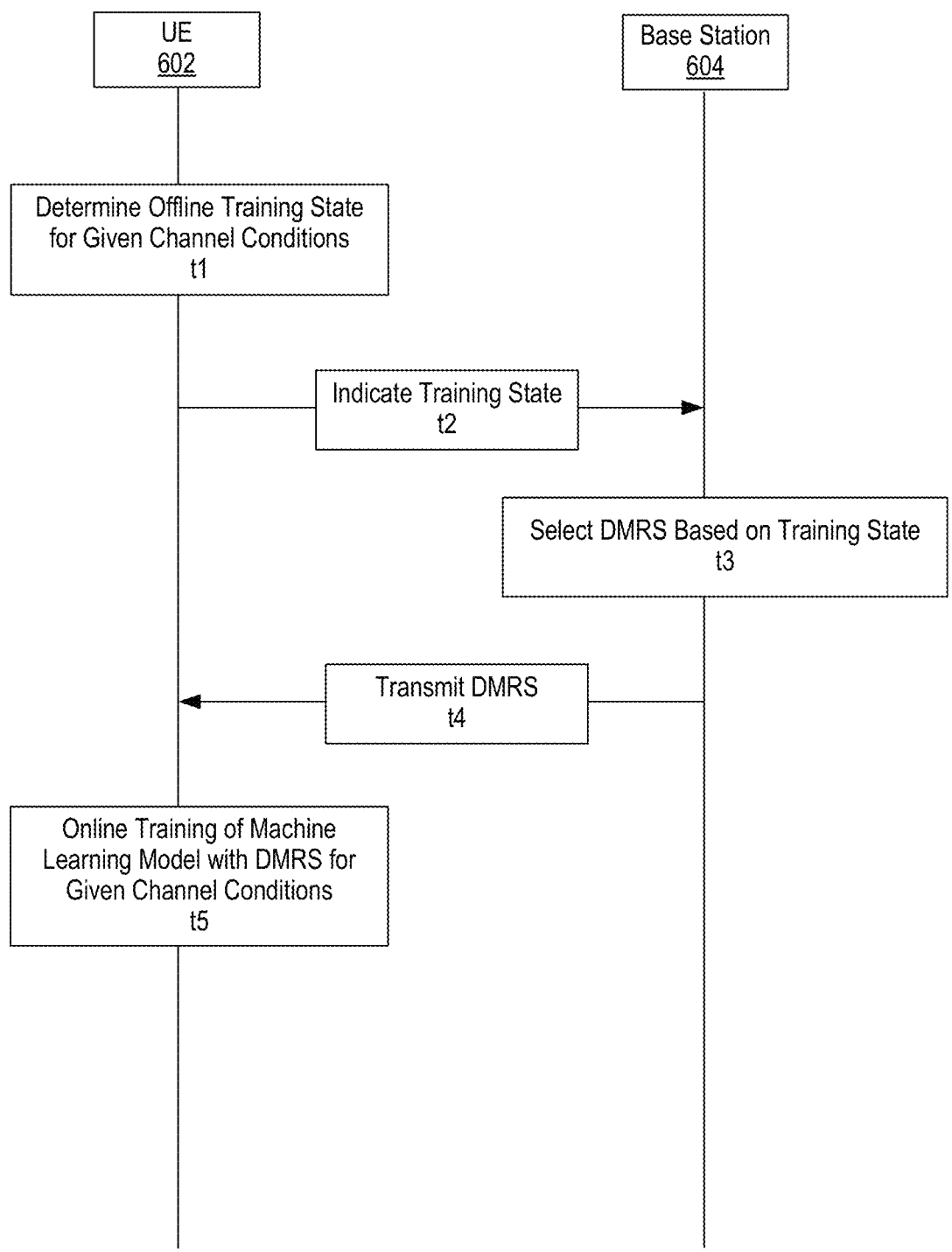
FIG. 6 is a call flow diagram for channel adaptive demodulation reference signal (DMRS) transmission based on UE feedback, in accordance with various aspects of the present disclosure.

FIG. 6 is a call flow diagram for channel adaptive demodulation reference signal (DMRS) transmission based on UE feedback, in accordance with various aspects of the present disclosure. At time t1, a UE 602 determines an offline training state for particular channel conditions. For example, a machine learning model may be well-trained or poorly-trained for the particular channel conditions. As described above, comparison of a decoding quality to a performance threshold may determine whether the machine learning model is well-trained or poorly-trained. At time t2, the UE informs a base station 604 of the training state. In other aspects, the UE may explicitly request a given number of DMRS symbols with a given rank to facilitate raw channel estimation (as described in more detail below). In response, at time t3, the base station configures a DMRS based on the training state. For example, the base station 604 may select a more frequent DMRS or a heavier DMRS pattern if the machine learning model is poorly-trained, in order to improve training. At time t4, the base station 604 transmits the configured DMRS. Finally, at time t5, the UE 602 trains its machine learning model for the particular channel conditions based on the received DMRS. By adaptively configuring the DMRS, the UE is able to more efficiently train its machine learning models.

An adaptive, configurable DMRS has other applications, as well. For example, in a millimeter wave system (e.g., frequency range two (FR2)), beam management procedures are executed to obtain best transmit beams and receive beams from the base station and UE, respectively, for a downlink scenario. Accordingly, downlink communications occur via the beamformed channel including the best transmit and receive beams. The effective beamformed channel, however, only represents a portion of the overall channel.

Figure 7:
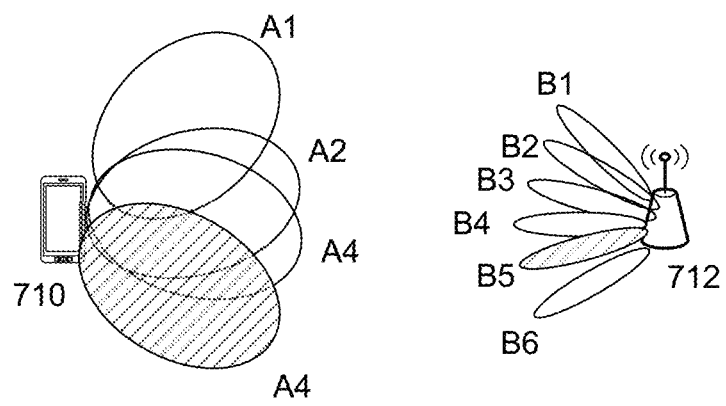
FIG. 7 is a block diagram illustrating transmit and receive beams, according to aspects of the present disclosure.

FIG. 7 is a block diagram illustrating transmit and receive beams, according to aspects of the present disclosure. A UE 710 communicates across the downlink with a base station 712 via a number of receive beams A1, A2, A3, and A4, as well as transmit beams B1, B2, B3, B4, B5, and B6. In this example, the best receive beam is the fourth beam A4 and the best transmit beam is the fifth transmit beam B5. The observed channel is thus the beam formed channel from the fifth transmit beam B5 and the fourth receive beam A4. If an estimate of the overall, raw channel is desired, beam sweeping may occur at the receiver side. For example, sweeping across four beams (e.g., A4, A3, A2, and A1) enables the UE to observe a 4×1 channel, instead of a 1×1 channel seen with a single receive beam (e.g., the fourth receive beam A4).

According to aspects of the present disclosure, to obtain an estimate of the raw channel, the UE 710 requests additional DMRSs. The additional DMRSs may be repeated DMRSs or newly defined DMRSs. In this aspect, the base station 712 transmits the DMRS four times from the fifth transmit beam B5. The UE 710 sweeps through the receive beams to receive each DMRS on a different receive beam (e.g., A1, A2, A3, or A4). Thus, the UE can measure the channel with a first beam A1 based on the first DMRS at a first symbol, can measure the channel with a second beam A2 based on the second DMRS at a second symbol, can measure the channel with a third beam A3 based on the third DMRS at a third symbol, and can measure the channel with a fourth beam A4 based on the fourth DMRS at a fourth symbol.

To enable these measurements of the raw channel, the UE adaptively requests multiple DMRS transmissions. In other words, the UE customizes the DMRS transmissions for a particular purpose, in this case, raw channel estimation. In one aspect, the UE requests a specific number of DMRS transmissions (e.g., four). In other aspects, the UE also requests a specific rank for the given number of symbols (e.g., a number of transmission layers). The DMRS transmission may occur in consecutive symbols, for example, three or four consecutive symbols.

The UE may request, from the base station, a given number of DMRS symbols with a given rank. For a mmWave use case, rank one and rank two transmissions are considered. In this case, the UE may request four DMRS symbols, each with rank one, for example. Or the UE may request four DMRS symbols, each with rank two, etc.

In some aspects, based on the measurements from the multiple receive beams, the UE may select a better beam, directed more specifically towards an incident beam. Thus, the additional overhead of extra DMRSs can be compensated for by improved throughput based on a better channel estimate. In contrast to current specifications that employ DMRS for beamformed channel estimation, aspects of the present disclosure apply to raw, non-beamformed channel estimation through consecutive beamformed measurements.

Figure 8:
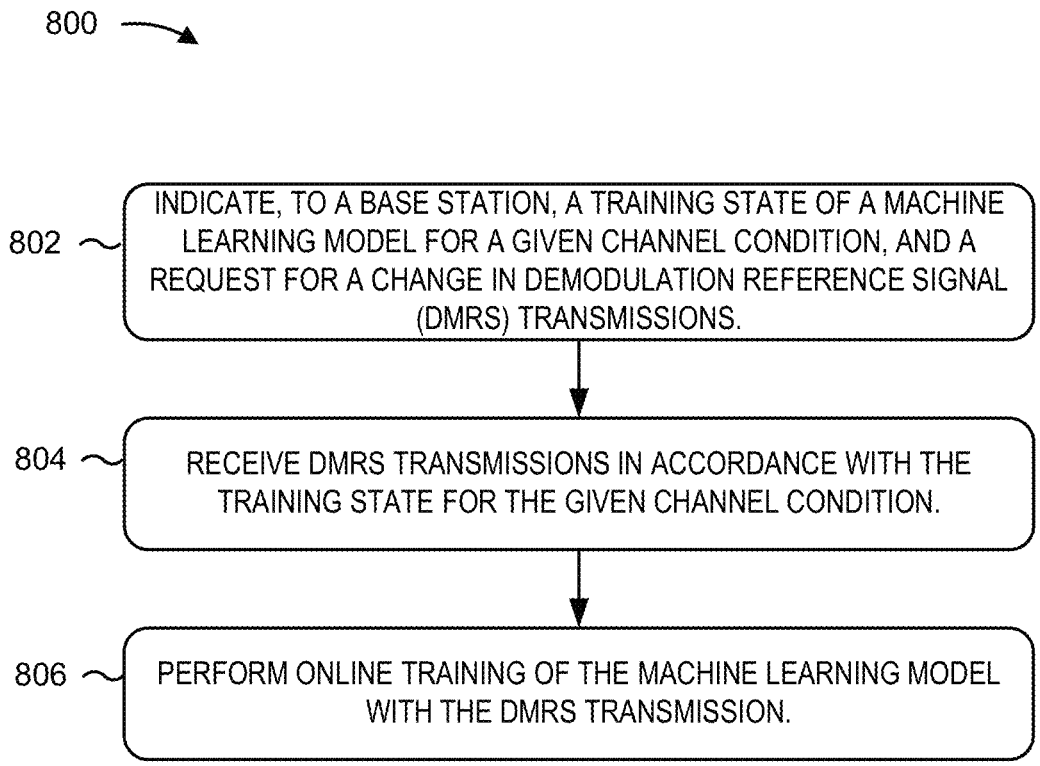
FIG. 8 is a flow diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. The example process 800 is an example of adaptive demodulation reference signal (DMRS) transmission, for example, with machine learning-based receivers.

As shown in FIG. 8, in some aspects, the process 800 may include indicating, to a base station, a training state of a machine learning model for a given channel condition, and a request for a change in demodulation reference signal (DMRS) transmissions (block 802). For example, the user equipment (UE) (e.g., using the antenna 252, DEMOD/MOD 254, MIMO detector 256, TX MIMO processor 266, receive processor 258, transmit processor 264, controller/processor 280, and/or memory 282) can indicate, to a base station, the training state and the request. In some aspects, the process 800 may include receiving DMRS transmissions in accordance with the training state for the given channel condition (block 804). For example, the UE (e.g., using the antenna 252, DEMOD/MOD 254, MIMO detector 256, receive processor 258, controller/processor 280, and/or memory 282) can receive DMRS transmissions. The process 800 may also include performing online training of the machine learning model with the DMRS transmission (block 806). For example, the UE (e.g., using the antenna 252, DEMOD/MOD 254, MIMO detector 256, TX MIMO processor 266, receive processor 258, transmit processor 264, controller/processor 280, and/or memory 282) can perform online training.

Figure 9:
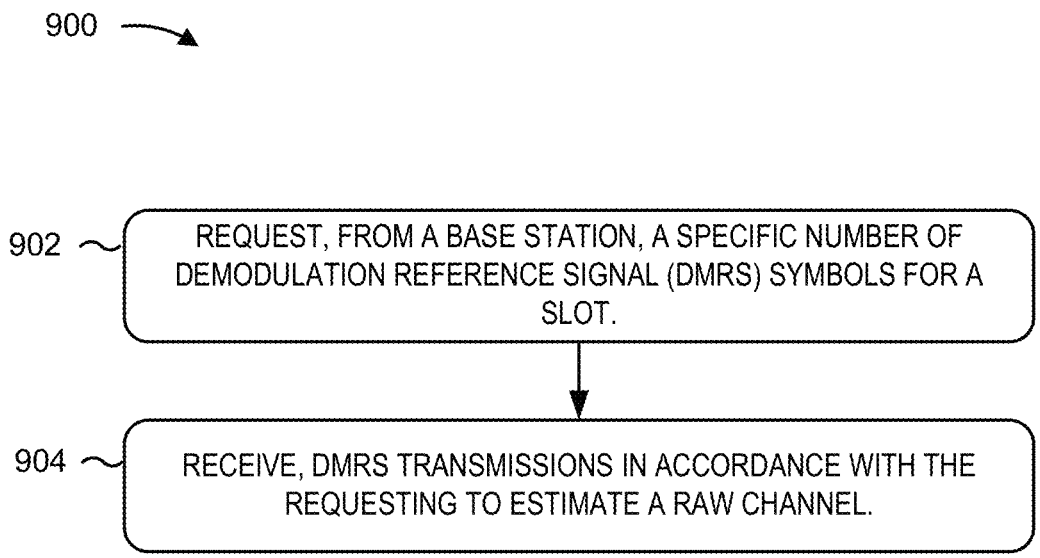
FIG. 9 is a flow diagram illustrating an example process performed, for example, by a user equipment, in accordance with various aspects of the present disclosure.

FIG. 9 is a diagram illustrating an example process 900 performed, for example, by a UE, in accordance with various aspects of the present disclosure. The example process 900 is an example of adaptive demodulation reference signal (DMRS) transmission, for example, with machine learning-based receivers.

As shown in FIG. 9, in some aspects, the process 900 may include requesting, from a base station, a specific number of demodulation reference signal (DMRS) symbols for a slot (block 902). For example, the UE (e.g., using the antenna 252, DEMOD/MOD 254, TX MIMO processor 266, transmit processor 264, controller/processor 280, and/or memory 282) can request the specific number of DMRS symbols. In some aspects, the process 900 may include receiving, DMRS transmissions in accordance with the requesting to estimate a raw channel (block 904). For example, the UE (e.g., using the antenna 252, DEMOD/MOD 254, MIMO detector 256, receive processor 258, controller/processor 280, and/or memory 282) can receive, the DMRS transmissions.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
    indicating, to a base station, a training state of a machine learning model for a given channel condition, and a request for a change in demodulation reference signal (DMRS) transmissions;
    receiving DMRS transmissions in accordance with the training state for the given channel condition; and
    performing online training of the machine learning model with the DMRS transmissions.

2. The method of claim 1, in which the training state indicates a decoding quality is above a threshold value, and the receiving comprises receiving a light DMRS pattern.

3. The method of claim 1, in which the training state indicates a decoding quality is above a threshold value, and the receiving comprises receiving fewer DMRS symbols in a slot.

4. The method of claim 1, in which the training state indicates a decoding quality is below a threshold value, and the receiving comprises receiving a heavy DMRS pattern.

5. The method of claim 1, in which the training state indicates a decoding quality is below a threshold value, and the receiving comprises receiving additional DMRS symbols in a slot.

6. The method of claim 1, in which the training state is based on a bit error rate associated with decoding by the machine learning model.

7. The method of claim 1, in which the indicating occurs via a physical uplink control channel.

8. The method of claim 1, further comprising indicating, to the base station, online training as a reason for indicating the training state.

9. The method of claim 1, in which a pattern of the received DMRS differs from a legacy DMRS pattern.

10. A method of wireless communication by a user equipment (UE), comprising:
    requesting, from a base station, a specific number of demodulation reference signal (DMRS) symbols for a slot; and
    receiving DMRS transmissions across a plurality of beams, in accordance with the requesting to estimate a raw, non-beamformed channel including the plurality of beams.

11. The method of claim 10, in which requesting comprises requesting a specific number of repeated DMRS symbols.

12. The method of claim 10, in which requesting comprises requesting a specific number of newly defined DMRS symbols.

13. The method of claim 10, in which the specific number of DMRS symbols comprises three symbols or four symbols.

14. The method of claim 13, in which the three symbols or four symbols comprise three consecutive symbols or four consecutive symbols.

15. The method of claim 10, further comprising performing a beam sweep across a specific number of beams corresponding to the specific number of DMRS symbols to obtain an estimate of the raw, non-beamformed channel.

16. The method of claim 10, further comprising requesting a rank corresponding to the specific number of DMRS symbols.

17. An apparatus for wireless communication by a user equipment (UE), comprising:
 a processor,
 memory coupled with the processor; and
 instructions stored in the memory and operable, when executed by the processor, to cause the apparatus:
  to indicate, to a base station, a training state of a machine learning model for a given channel condition, and a request for a change in demodulation reference signal (DMRS) transmissions;
  to receive DMRS transmissions in accordance with the training state for the given channel condition; and
  to perform online training of the machine learning model with the DMRS transmissions.

18. The apparatus of claim 17, in which the training state indicates a decoding quality is above a threshold value, and in which the processor causes the apparatus to receive a light DMRS pattern.

19. The apparatus of claim 17, in which the training state indicates a decoding quality is above a threshold value, and in which the processor causes the apparatus to receive fewer DMRS symbols in a slot.

20. The apparatus of claim 17, in which the training state indicates a decoding quality is below a threshold value, and in which the processor causes the apparatus to receive a heavy DMRS pattern.

21. The apparatus of claim 17, in which the training state indicates a decoding quality is below a threshold value, and in which the processor causes the apparatus to receive additional DMRS symbols in a slot.

22. The apparatus of claim 17, in which the training state is based on a bit error rate associated with decoding by the machine learning model.

23. The apparatus of claim 17, in which the processor causes the apparatus to indicate via a physical uplink control channel.

24. The apparatus of claim 17, in which the processor causes the apparatus to indicate, to the base station, online training as a reason for indicating the training state.

25. The apparatus of claim 17, in which a pattern of the received DMRS differs from a legacy DMRS pattern.

26. An apparatus for wireless communication by a user equipment (UE), comprising:
 a processor,
 memory coupled with the processor; and
 instructions stored in the memory and operable, when executed by the processor, to cause the apparatus:
  to request, from a base station, a specific number of demodulation reference signal (DMRS) symbols for a slot; and
  to receive DMRS transmissions across a plurality of beams, in accordance with the requesting to estimate a raw, non-beamformed channel including the plurality of beams.

27. The apparatus of claim 26, in which the processor causes the apparatus to request a specific number of repeated DMRS symbols.

28. The apparatus of claim 26, in which the processor causes the apparatus to request a specific number of newly defined DMRS symbols.

29. The apparatus of claim 26, in which the specific number of DMRS symbols comprises three symbols or four symbols.

30. The apparatus of claim 29, in which the three symbols or four symbols comprise three consecutive symbols or four consecutive symbols.

31. The apparatus of claim 26, in which the processor causes the apparatus to perform a beam sweep across a specific number of beams corresponding to the specific number of DMRS symbols to obtain an estimate of the raw, non-beamformed channel.

32. The apparatus of claim 26, in which the processor causes the apparatus to request a rank corresponding to the specific number of DMRS symbols.

33. A user equipment (UE) for wireless communications, comprising:
 means for indicating, to a base station, a training state of a machine learning model for a given channel condition, and a request for a change in demodulation reference signal (DMRS) transmissions;
 means for receiving DMRS transmissions in accordance with the training state for the given channel condition; and
 means for performing online training of the machine learning model with the DMRS transmissions.

34. The UE of claim 33, in which the training state indicates a decoding quality is above a threshold value, and the receiving means comprises means for receiving a light DMRS pattern.

35. The UE of claim 33, in which the training state indicates a decoding quality is above a threshold value, and the receiving means comprises means for receiving fewer DMRS symbols in a slot.

36. The UE of claim 33, in which the training state indicates a decoding quality is below a threshold value, and the receiving means comprises means for receiving a heavy DMRS pattern.

37. The UE of claim 33, in which the training state indicates a decoding quality is below a threshold value, and the receiving means comprises means for receiving additional DMRS symbols in a slot.

38. The UE of claim 33, in which the training state is based on a bit error rate associated with decoding by the machine learning model.

39. The UE of claim 33, in which the means for indicating operates via a physical uplink control channel.

40. The UE of claim 33, further comprising means for indicating, to the base station, online training as a reason for indicating the training state.

41. The UE of claim 33, in which a pattern of the received DMRS differs from a legacy DMRS pattern.

42. A user equipment (UE) for wireless communications, comprising:
 means for requesting, from a base station, a specific number of demodulation reference signal (DMRS) symbols for a slot; and
 means for receiving DMRS transmissions across a plurality of beams, in accordance with the requesting to estimate a raw, non-beamformed channel including the plurality of beams.

43. The UE of claim 42, in which the requesting means comprises means for requesting a specific number of repeated DMRS symbols.

44. The UE of claim 42, in which the requesting means comprises means for requesting a specific number of newly defined DMRS symbols.

45. The UE of claim 42, in which the specific number of DMRS symbols comprises three symbols or four symbols.

46. The UE of claim 45, in which the three symbols or four symbols comprise three consecutive symbols or four consecutive symbols.

47. The UE of claim 42, further comprising means for performing a beam sweep across a specific number of beams corresponding to the specific number of DMRS symbols to obtain an estimate of the raw, non-beamformed channel.

48. The UE of claim 42, further comprising means for requesting a rank corresponding to the specific number of DMRS symbols.

49. A non-transitory computer-readable medium having program code recorded thereon, the program code executed by a user equipment (UE) and comprising:

program code to indicate, to a base station, a training state of a machine learning model for a given channel condition, and a request for a change in demodulation reference signal (DMRS) transmissions;

program code to receive DMRS transmissions in accordance with the training state for the given channel condition; and program code to perform online training of the machine learning model with the DMRS transmissions.

50. A non-transitory computer-readable medium having program code recorded thereon, the program code executed by a user equipment (UE) and comprising:

program code to request, from a base station, a specific number of demodulation reference signal (DMRS) symbols for a slot; and program code to receive DMRS transmissions across a plurality of beams, in accordance with the requesting to estimate a raw, non-beamformed channel including the plurality of beams.

* * * * *